March 17, 1936.  E. J. W. RAGSDALE  2,034,536
WELDING MACHINE
Original Filed Aug. 20, 1931  4 Sheets-Sheet 1
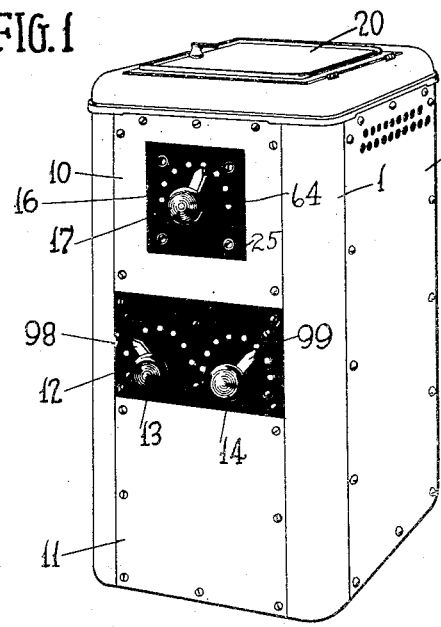
FIG.1
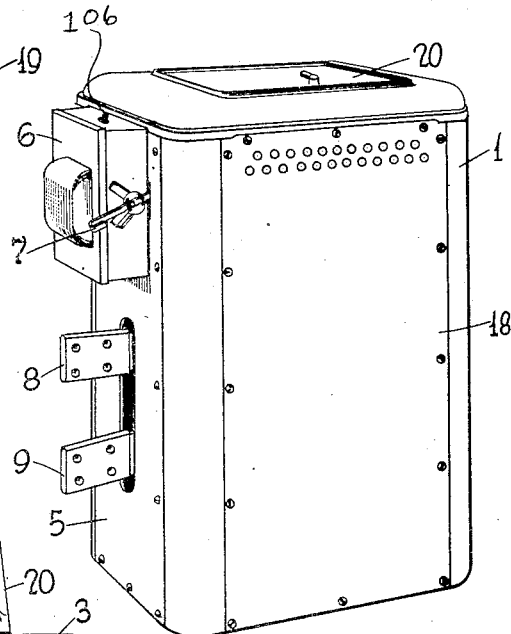
FIG.2
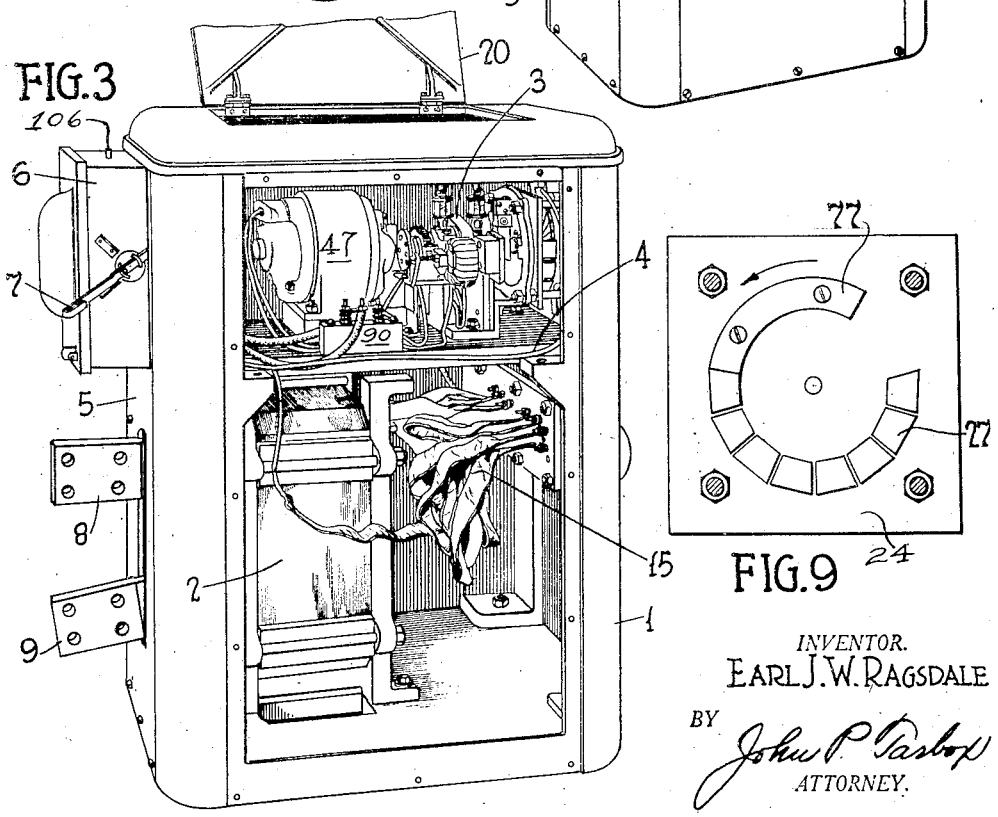
FIG.3
FIG.9
INVENTOR.
EARL J. W. RAGSDALE
BY John P. Pashon
ATTORNEY.

March 17, 1936.  E. J. W. RAGSDALE  2,034,536
WELDING MACHINE
Original Filed Aug. 20, 1931  4 Sheets-Sheet 2

INVENTOR.
EARL J. W. RAGSDALE
BY John P. Tarbox
ATTORNEY.

March 17, 1936.  E. J. W. RAGSDALE  2,034,536
WELDING MACHINE
Original Filed Aug. 20, 1931  4 Sheets-Sheet 3
FIG. 6
FIG. 8
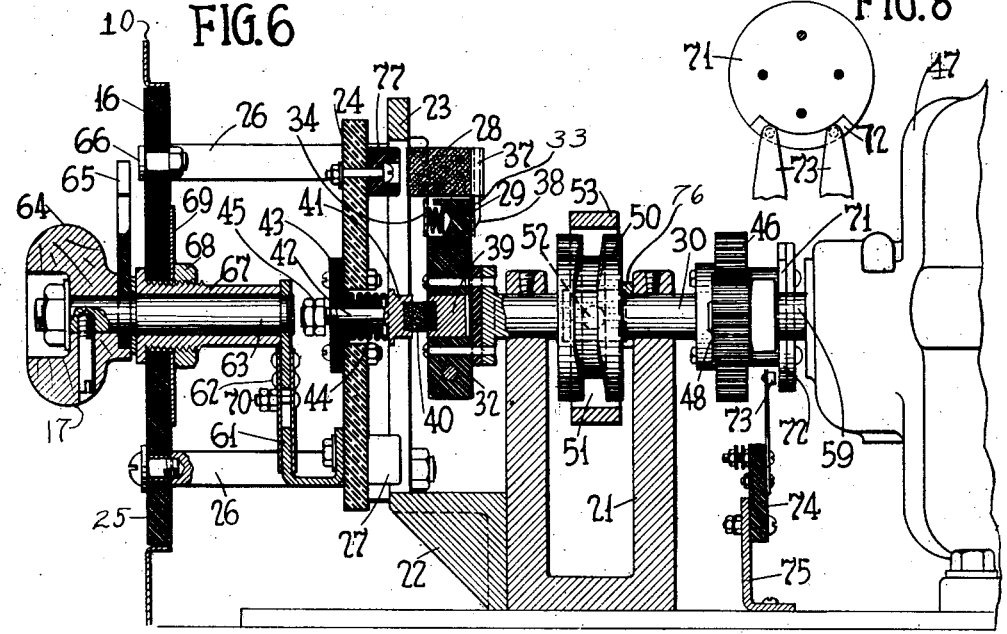
FIG. 7
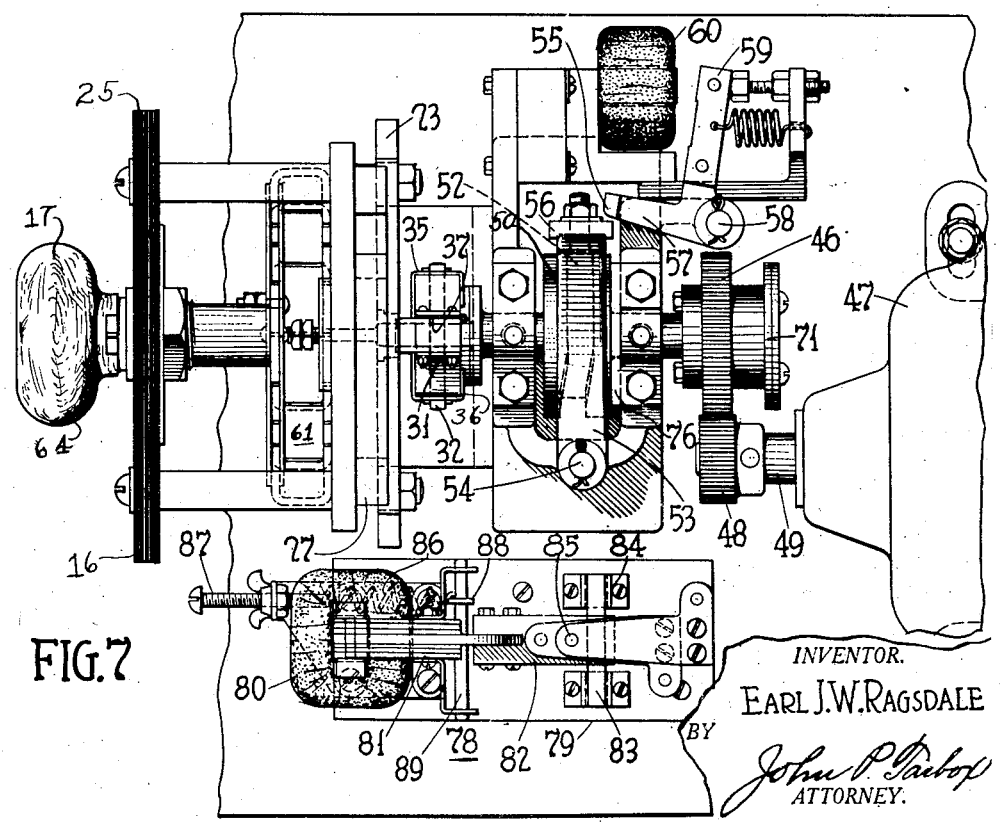
INVENTOR.
EARL J. W. RAGSDALE
BY
John P. Paxton
ATTORNEY.

March 17, 1936.　　　E. J. W. RAGSDALE　　　2,034,536
WELDING MACHINE
Original Filed Aug. 20, 1931　　　4 Sheets-Sheet 4
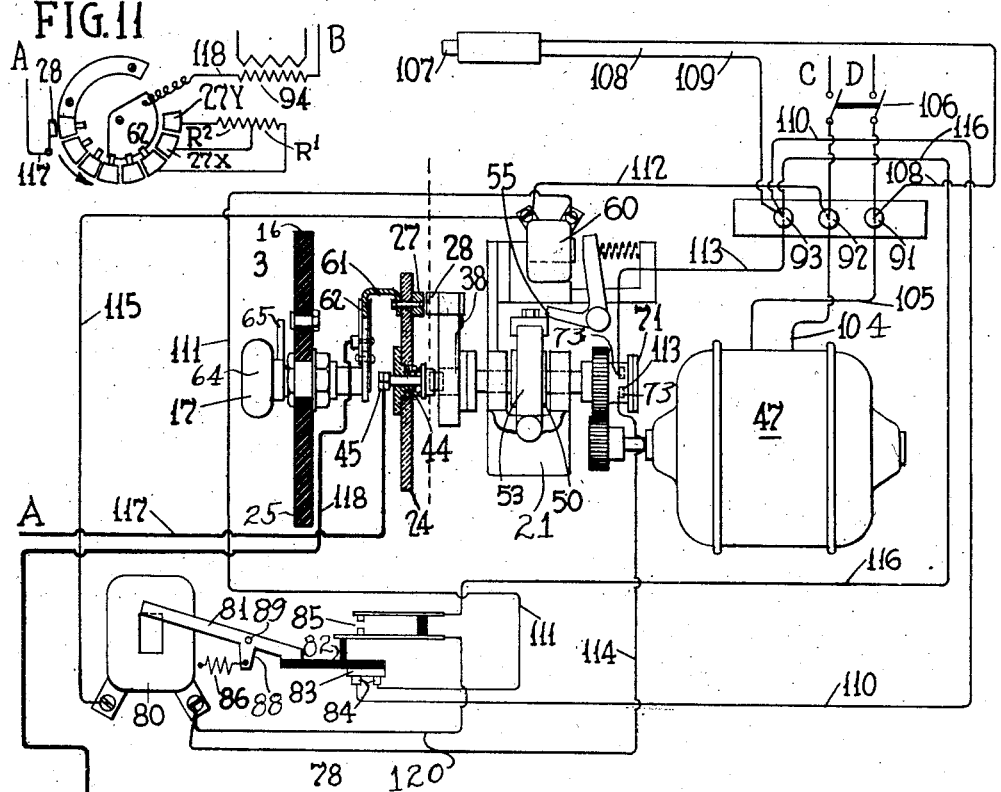
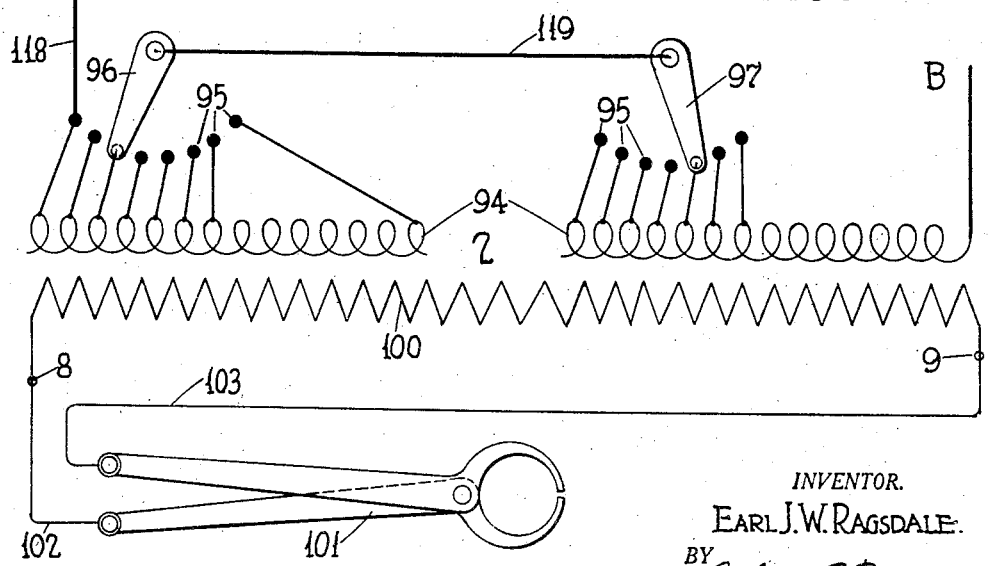
INVENTOR.
Earl J. W. Ragsdale.
BY John P. Tarbox
ATTORNEY.

Patented Mar. 17, 1936

2,034,536

UNITED STATES PATENT OFFICE 2,034,536

WELDING MACHINE

Earl J. W. Ragsdale, Norristown, Pa., assignor to Edward G. Budd Manufacturing Co., Philadelphia, Pa., a corporation of Pennsylvania Application August 20, 1931, Serial No. 558,220
Renewed July 7, 1933

25 Claims. (Cl. 219—4)

The present invention relates to electric welding and more particularly to a timing system and timing apparatus for power control for instantaneous spot welding, especially of the kind required for stainless steel or other metals in which the degree of heat, duration of its application, and total amount and extent of diffusion are important factors determining the quality of the finished product.

In such spot welding it is necessary to apply sufficient current to raise the spot to the welding temperature, but very desirable in most cases to limit the duration of current application to such brief interval of time as will not cause a storage of heat in the surrounding metal to an amount sufficient to prevent proper quenching and result in impairment of the desirable qualities of the metal.

In practice, this brief interval of time even when operating with 60 cycle current supply, is usually less than that required for the current to reach its maximum value after closure of the circuit. For this reason it has been found necessary to use a source of current supply of a capacity far in excess of that required, in order that the required instantaneous current value may be attained within a time interval less than that required for the current source to reach its maximum.

Because of the excess capacity and consequent possibility, in some cases, of overheating the work should the current be given time to attain its maximum instantaneous value, it is important that the means used for timing be accurate and reliable.

One object of the present invention therefore is to provide a system and apparatus for power control whereby instantaneous application and withdrawal of the welding current may be effected with accuracy of timing, and whereby a single instantaneous application and termination of current may be effected at will without danger of repetition or overtiming.

Heretofore in electrical welding, there has been little or no necessity for extremely short period energizing impulses, and where ordinary short impulses have been required, either vibratory or high speed, start-and-stop rotary switching devices have been used. In the present invention, the various difficulties incident to the use of rotary motion such as inability to start and stop quickly, and those incident to oscillatory or vibratory motion such as inertia losses, excess wear and shock, and uncertainty in timing, are overcome in general through the use of a combination rotary motion and reciprocating motion in a manner to take advantage of the uniform high speed attainable with continuous rotary motion, and the quick intermittent movement attainable with oscillatory motion where such movement is relatively small and is confined to relatively light parts.

More specifically, some of the objects of the invention are attained by the provision of a stationary contact and a relatively movable contact arranged to be rotated past the stationary contact at a high rate of speed, and normally spaced a short distance therefrom but in sufficiently close proximity to be readily, instantaneously moved into and out of position to engage the stationary contact in its passage thereover. The arrangement is such that the movable contact is first brought into the plane of the stationary contact against an insulating surface in substantially the plane of the stationary contact so as to move on to and across the stationary contact in sliding engagement therewith, and is moved out of the plane of the stationary contact only after leaving the latter at the normal high rate of speed. The arc, if any, is thus broken by the relative rotary motion of the movable contact and not by the relative oscillatory movement of the rotary contact. Inasmuch as the oscillatory movement of the movable contact is not a circuit breaking movement it may be made extremely slight by making the normal spacing between the contacts sufficient only to prevent the striking of an arc, and striking distance, in the present instance is especially small because of the fact that the air in the gap is maintained in circulation due to the constant, relative rotary movement of the contacts.

Another important object of the invention is the provision of a push button control such that the circuit making and breaking apparatus may be readily controlled from a point remote from the apparatus itself and in proximity to the work, for example by a push button adjacent or mounted on the welding tool.

A further object is the provision of an arrangement for reducing the current in one or more steps before each braking of the circuit.

Various other objects and advantages of the invention will be apparent from a perusal of the following specification and the drawings accompanying the same.

In the drawings, which illustrate a preferred embodiment of the invention;

Fig. 1 is a perspective view of the apparatus assembled and encased, showing the control panels.

Fig. 2 is a similar view showing the side at which the electrical input and output connections are made.

Fig. 3 is a view like Fig. 2 but slightly enlarged and with the near-side, side panel removed to show the interior.

Fig. 6 is a vertical, axial cross section of the timing and controlling apparatus omitting the main portion of the driving motor.

Fig. 7 is a top plan view of Fig. 6 omitting the mounting base for the sake of clearness.

Fig. 8 is a detail view showing the disc commutator for the control circuit.

Fig. 9 is a rear view of the contact block showing the timing contact segments.

Fig. 10 is a circuit diagram of the complete system.

Fig. 11 is a circuit diagram of a modified arrangement for reducing an arc, if one exists when breaking the circuit.

Figure 4:
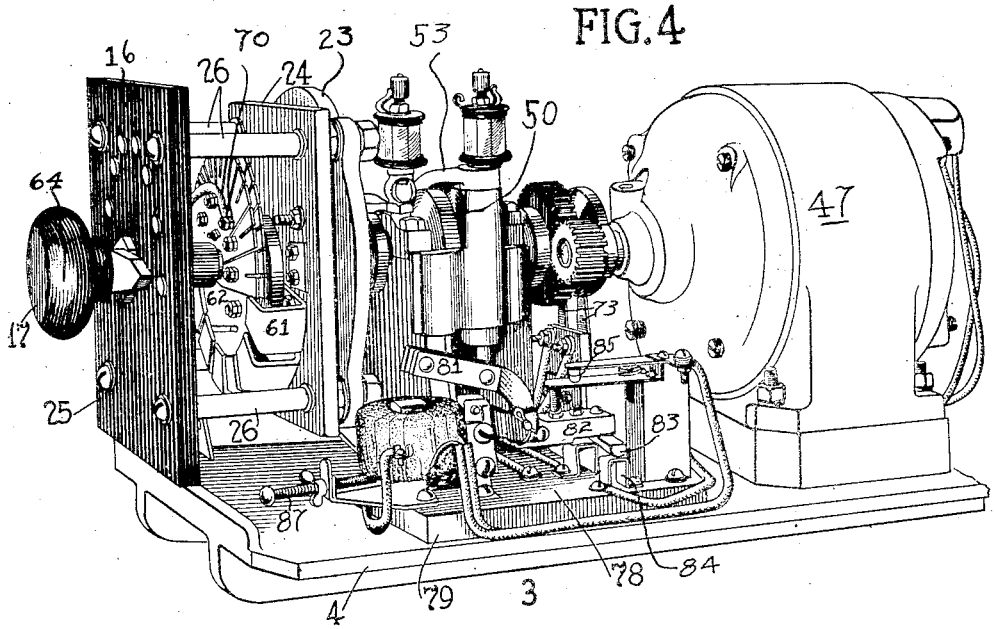
Fig. 4 is a perspective view of the timing and control apparatus.
Figure 5:
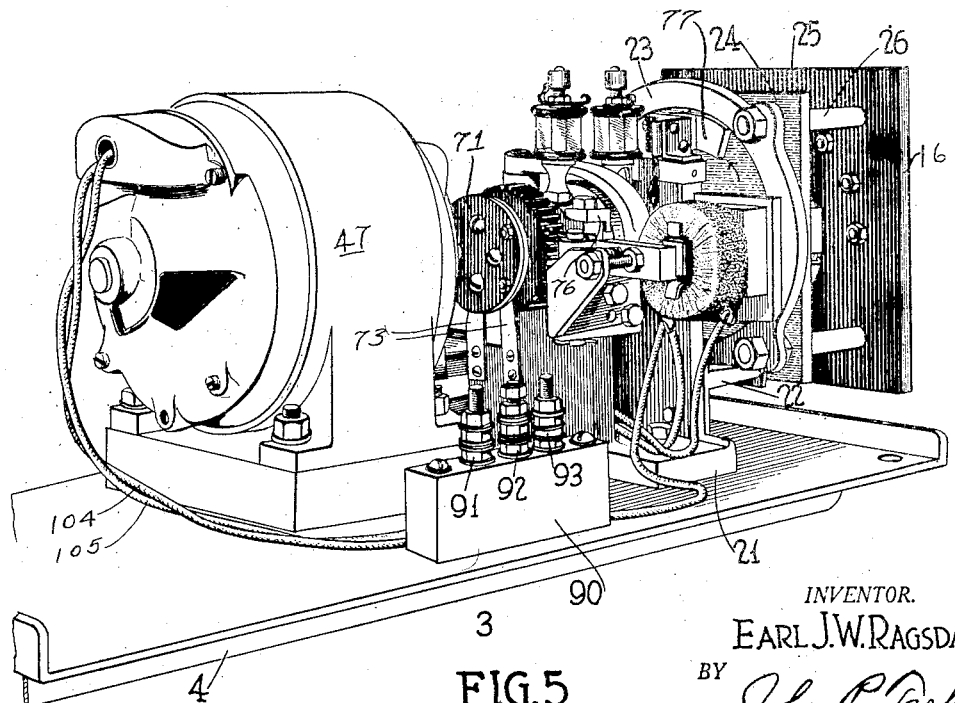
Fig. 5 is a perspective view of the apparatus of Fig. 4, looking in the opposite direction.

The apparatus of the invention assembled as a portable unit is shown in Figs. 1 to 3, and comprises in general a frame or chassis 1 in the lower portion of which is mounted a welding transformer 2, and in the upper part of which the timing and control apparatus 3 is mounted on a supporting shelf 4. The closure panel 5 covering one end of the frame carries a switch box 6 of standard type housing a suitable switch actuated by a lever 7 for controlling the main power supply to the welding transformer. At the top of the box 6 is mounted a small snap switch 106 of standard or other suitable type controlling a power supply of relatively low voltage for the control circuits. Projecting through the casing, below the switch box 6, are a pair of welding current terminal lugs 8 and 9 which constitute the terminals of the secondary winding of the transformer and supply the controlled welding current to the welding tool in a manner to be later described.

The opposite end of the chassis is closed by upper and lower closure panels 10 and 11, and a central transformer control panel 12 containing controls 13 and 14 for controlling the connections of the tap leads 15 of the transformer primary winding. Mounted in the upper panel 10 is a timer control panel 16 containing the timer control 17. Closure of the chassis is completed by the side closure panels 18 and 19, and a hinged lid 20 at the top.

Referring to the drawings in detail and particularly to Figs. 4 to 9, showing the timing and control apparatus, the supporting shelf 4 which acts as a general mounting base, has secured thereto a U-shaped support 21 to which is secured a bracket 22 which supports the vertical mounting ring 23 integral with the bracket. The contact block of insulating material such as hard insulating fibre, and the timer control panel 16 of bakelite or like material, are secured to the mounting ring 23 by spacing studs 26 as clearly shown in perspective in Fig. 4.

As shown in Figs. 6 and 9, the timing contact segments 27 mounted on the block 24 are arranged in an arc projecting partly into the circular opening in the mounting ring 23 but spaced from the inner surface of the ring. A timing brush 28 carried by a rotary brush arm 29 of insulating material, mounted on the shaft 30 for rotation therewith, is arranged to sweep around over the segments 27 but normally spaced out of contact therewith by a small clearance as shown in Fig. 6. The brush holder 31 in which the brush is directly mounted, is of bifurcated form extending down each side of the brush arm 29 to a point below the shaft (Fig. 6) where it is pivotally connected with the arm by means of the pivot rod 32 (Figs. 6 and 7), and is biased in a direction toward the contact block 24 by expansion coil springs 33 (one shown) nested in the brush arm and bearing against the front portion 34 of a yoke 35 carried by the brush holder. The rear extensions 36 of the yoke bear against the back of the brush arm 29 and act as a stop to normally hold the brush 28 spaced away from the contact segments 27 as shown in Fig. 6.

Electrical connection is made with the brush 28 by means of the flat contact plate 37 which as shown in Fig. 7, is mounted in the brush holder along side of the brush, and connects through a suitable flexible conductor 38 with a metallic hub section 39 at the center of the brush arm. Electrical connection is established with this hub section through a floating connecting plug 40 of low friction, conducting material such as hard smooth grain carbon or graphite resiliently held in place and permitted to move axially with the brush arm by means of a spring pressed cap 41 carried at the end of a rod 42 slidably mounted in an insulating bearing 43. The cap 41 is spring pressed against the floating plug 40 by the spring 44, normally displacing the brush arm 29 and shaft 30 toward the motor 47. The cap 41 and rod 42 are of conducting material and therefore serve to extend the electrical connection from the plug 40 to the outside of the insulating bearing 43 where electrical connection may be made with the rod by means of lock nuts 45 threaded on to the outer end of the rod.

The shaft 30 is driven by the motor 47 through gear 46 and pinion 48 mounted on the shaft 30 and the motor shaft 49, respectively. The driving shaft 30 carries, fixed thereon, a cam member 50 provided with a cam groove 51 which receives a pin 52 carried in the bend of a U-shaped yoke member 53 pivoted at 54 between the upstanding arms of the U-shaped support 21. The free end or bend of the yoke 53 is arranged to engage the end of the movable detent 55 through the intermediation of a wear plate 56 mounted on the end of the yoke. The movable detent 55 is carried on the end of a lever 57 pivoted at 58 and operated by an armature 59 in turn actuated by the magnet 60. These parts are so arranged, as is clearly shown in Fig. 7, that rotation of the shaft 30 will cause the yoke member 53 to oscillate toward and away from the contact block 24 due to the action of the cam 50 and pin 52, the shaft 30 being held against longitudinal movement under tension of compression spring 44. The magnet 60, upon energization, operates to attract the armature 59 and thereby throw the detent 55 into the path of the wear plate 56 to hold the yoke against return movement in the direction of the motor. The shaft 30, being slidably mounted in the support 21 is thereby forced toward the contact block against the tension of the spring 44 due to the action of the pin 52 (now held stationary) and the cam 50. This forward movement of the shaft 30 moves the brush 28 into contacting relation with the contact segments 27, the brush being resiliently held in rubbing contact by the coil springs 33. The brush is thus caused to sweep over the contacts in engagement therewith, but only for a portion of one revolution of the shaft due to release of the detent 55 in that time, in a manner to be later described.

Electrical connection is extended from each of the segments 27 to the front side of the contact block 24 through connecting flanges 61, individual to each segment, which connecting flanges are arranged to be bridged by a distributor brush 62 (Figs. 4 and 6), which latter by connecting with one or more of such flanges establishes electrical connection with one or more successive segments 27 to vary the effective length of the conducting arc formed by the segments 27. The distributing brush 62 is carried at the end of a shaft 63 arranged to be turned by means of a knob 64 secured thereto outside the control panel 16, the position of the distributor brush being indicated outside the panel by means of the indicator arm 65 arranged to sweep over indicating buttons 66 mounted in the panel along an arc as shown in Figs. 1, 3 and 6. The shaft 63 is journaled in a bushing 67 which passes through the control panel 16 and is clamped in place by a threaded clamping ring 68 which latter clamps against a bearing plate 69 placed between the clamping ring and the panel. Electrical connection is made with the distributor brush by means of the binding post 70 through a suitable flexible conductor not shown.

For controlling the magnet 60 in synchronism with the shaft 30 a commutator disc 71 of insulating material is mounted at the end of the shaft 30 and carries a commutator segment 72 arranged to bridge a pair of contacts 73, at a given point in each rotation of the shaft, the contacts 73 being connected in a suitable control circuit to be hereinafter described. These contacts are mounted on a block 74 of insulating material in turn mounted on the main support 4 by means of the angle piece 75.

A stop plate 76 is mounted between the support 21 and the motor side of the cam member 50 to engage the adjacent face of the cam member and thus limit the movement of the shaft 30 toward the motor under the tension of spring 44. To hold the contacting face of the brush 28 in the plane of the segments 27 against the tension of spring 33 when moved into contacting position by the cam, a ramp segment 77 of insulating material is mounted on the contact block in the arc of the contact segments as shown in Figs. 6 and 9, the approach end of the ramp segment being slightly beveled as indicated in Fig. 9.

For further electrical control of the apparatus above described, a locking relay 78 is provided which is mounted beside the apparatus as shown in Figs. 4 and 7. This relay comprises a mounting base 79 on which is mounted the actuating magnet 80 and an armature 81 therefor, pivoted at 89 and arranged upon energization of the magnet to raise the bar 82 of insulating material carrying a bridging contact bar 83 normally held in engagement with a pair of stationary contacts 84. Raising of the bar thus opens the contacts 84. A pair of normally open contacts 85 are mounted above the bar to be closed by the raising of the bar. A retractile spring 86 connected between an anchor screw 87 and an arm 88 extending downwardly from the armature pivot 89, operates to hold the armature down in the normal position as shown in Fig. 4, and as diagrammatically shown in Fig. 10. For making the several circuit connections, a binding post support 90 is mounted at the opposite side of the apparatus (Fig. 3) and carries a set of three binding posts 91, 92 and 93.

Referring now to the circuit diagram, Fig. 10, the essential elements of the apparatus above described are here shown diagrammatically and indicated by similar reference numerals. In addition, the circuit diagram shows the primary winding 94 of the welding transformer 2 with its tap terminals 95 arranged in arcs to be engaged by the contact wiper arms 96 and 97 for varying the number of effective primary turns and consequently the output capacity of the transformer. The wiper arms 96 and 97 are operated in suitable manner by the knobs 13 and 14, respectively, mounted outside the welding circuit control panel 12, (Fig. 1), the knobs being provided with indicators 98 and 99 arranged to sweep over their respective arcs of suitable numbered indicator buttons. The secondary winding 100 terminates in the terminal lugs 8 and 9 to which is connected the welding tool, such as the tongs 101, by means of flexible current leads 102 and 103. Power is supplied to the primary winding of the transformer from a suitable source of alternating current, over the power line A—B, the right hand terminal of the primary winding being connected directly to the B-side of line while the left hand side of the winding is arranged to be connected to the A-side of line through the brush 28 and segments 27 of the switching mechanism. Current is supplied to the motor 47 and the various control circuits from a suitable source of power over the line circuit C—D, which is preferably of a lower voltage than that of the transformer supply, an example of a ratio in practice being 220 volts for the transformer supply and standard 110 volts alternating current circuit for the control circuit supply. As shown in the diagram the line conductors C—D connect to the binding posts 92 and 91 respectively from which the connection is extended directly to the motor by way of conductors 104 and 105, the current supply being controlled by a suitable switch 106, which for convenience may be mounted in the top part of the main switch box 6 as indicated at 106 in Fig. 2. The control apparatus is completed by a push button 107 connected through flexible leads 108 and 109 to the binding posts 91 and 93 respectively, the flexible leads being of sufficient length to enable the push button 107 to be held and operated by the operator using the welding tongs 101, or to be mounted on the tongs.

In operation, the control circuit switch 106 is closed, which energizes the driving motor 47, after which the switch lever 7 (Fig. 2) of the main power switch is operated to close the switch and connect the power supply to the power supply lines A—B (Fig. 10). The brush 28 being normally spaced from the segments 27, there is at this time no current flow to the transformer. The motor 47 operating, transmits the rotation of its shaft through the pinion 48 and gear 46 to the driving shaft 39 which in turn rotates the brush 28 around over the segments 27 but out of contact therewith as indicated in Fig. 10, the brush being held out of contact by the action of the compression spring 44. Rotation of the cam member 50 causes the yoke member 53 to oscillate to and away from the contact block 24 once in each revolution, the cam groove 51 being so arranged that the yoke moves away from the contact block 24 when the brush is opposite ramp segment 77 (Fig. 9) and stays in the rearward position until after the brush has passed the last contact segment 27 moving in a counter-clockwise direction as indicated by the arrow in Fig. 9. As the detent 55 is normally out of engaging position relative to the yoke 53, the yoke thus oscillates continuously without affecting the position of the brush 28, which latter continues to be held out of contact with the segments due to displacement of the shaft 30 toward the right under tension of the spring 64. The operator now desiring to make a weld, adjusts the tongs 101 to the work and operates the push button 107 to close the circuit through flexible leads 108—109, which energizes magnet 60 over a path which may be traced from line D, binding post 91, flexible conductor 108, push button 107, flexible conductor 109, binding post 93, conductor 110, bridged contacts 84, conductor 111, magnet 60, conductor 112 and binding post 92 back over line wire C.

Energization of magnet 60 causes the detent 55 to swing into the path of the yoke, either immediately if the yoke is at the end of its left hand swing, or after an extremely short interval upon the first succeeding left hand swing of the yoke. It is to be noted here that this interval is extremely short due to the high rate of rotation of the shaft 30. As the brush 28 moves into a position opposite the ramp 77, the yoke tends to oscillate to the right, but meeting the detent 55 is held stationary, whereupon the shaft 30 is forced to the left against the tension of the spring 64 thus moving the brush 28 into contact with the ramp 77 under tension of the brush spring 33. The brush continuing to rotate sweeps around over the cam and contact segments 27 in a counter-clockwise direction, as indicated by the arrow in Fig. 9, in rubbing contact with the segments 27, until it leaves the last segment, whereupon the commutator segment 72 on the disc 71 rotating into a position to bridge the contacts 73 closes the circuit of magnet 80 of the relay 78 over a path which may be traced from line conductor D through push button 107 to binding post 93, as before traced, and thence by way of conductor 113, contacts 73, conductor 114, relay 80, conductors 115, 112 and binding post 92 back over line conductor C. Energization of the magnet 80 operates the relay 78 to open contacts 84 and close contacts 85. The opening of contacts 84 opens the circuit of magnet 60 permitting the brush 28 to move back away from engaging position with the contact segments 27 immediately after leaving the last contact segment. The closure of contacts 85 completes a locking circuit for the magnet 80 which may be traced from line conductor D through push button 107 to binding post 93 as previously traced, and thence over conductor 116 through contacts 85, 120, 80, 115, 112, 92 back over line C. The relay 78 thus remains locked while the push button 107 is closed which holds open the circuit of magnet 60 to prevent further operation of the switching mechanism until after the push button is released. The release of the push button opens the circuit through conductors 108—109 which opens the locking circuit of relay 78 and restores the circuits to normal. Thus, there can be but one operation of the switching mechanism for each closure of the push button, although the rotary motion of the switch is continuous and at high speed. As the normal gap between the brush 28 and segments 27 need be only sufficient to prevent the striking of an arc, this gap can be made very slight thus requiring but very slight movement to throw the brush into and out of operative relation with the segments which in turn requires but very slight oscillatory movement of the yoke 53. It is to be noted that this slight movement is not depended upon for the breaking of the arc and that the arc is broken by the extremely high speed rotary movement of the brush. The brush leaving the last contact at high speed operates to open the transformer supply circuit with minimum arc.

This circuit through the primary of the transformer may be traced from the A-side of line over conductor 117, binding post 45, brush 28, segments 27, distributor 62, conductor 118, left hand section of primary winding 94, wiper arm 96, conductor 119, wiper arm 97, right hand section of primary winding and back over the B-side of line.

To vary the length of the time of circuit closure the operator turns the knob 17 to move the distributor brush 62 into contact with a varying number of the connecting flanges 61 to render active a greater or less number of contact segments 27 as will be clear from Fig. 4. For example, referring to Fig. 9, if when the last segment 27 is rendered effective by connection of the distributor brush 62 with the corresponding connecting flange 61 of such segment only, the circuit will be closed for one unit of time corresponding to the arc covered by the segment. Adjustment of the distributor brush to connect with the last two segments will accordingly increase the time of circuit closure to two units, or that corresponding to the arc covered by such last two segments, and so on as the distributor brush is moved to connect with successive segments.

In order to further reduce the electric arc between the brush 28 and contact segments, the last two segments may be arranged to be permanently out of operative engagement with the distributor brush and shunted by resistances as indicated in Fig. 11. With this arrangement, assuming the brush 28 to rotate counter-clockwise as indicated by the arrow, the movement of the brush over the segments in contact therewith will close the circuit through the primary winding 94 of the welding transformer, which circuit may be traced from line wire A, conductor 117, brush 28, through the first segment with which the distributor brush 62 is in contact, distributor brush 62, conductor 118 and through primary winding 94 to B-side of the power line. The current is maintained in full strength as the brush 28 moves on into contact with the succeeding segments with which the distributor 62 is connected and until the brush moves further into engagement with the segment 27X and out of engagement with the last segment connected to the distributor, whereupon the resistance R' is connected in circuit between the brush and the distributor thus reducing the flow of current. As the brush moves on into engagement with segment 27Y and out of contact with segment 27X, both resistances R2 and R1 are connected in series between the brush and the distributor thus reducing the current still further so that when the brush leaves the last segment 27Y to break the circuit, the current is much reduced over that of the maximum, giving a reduced arc at breaking.

It will be noted that all during operation, regardless of the frequency of welds made, the motor runs continuously, and continuously drives the rotary brush with the result that the circuit making and breaking movement of the brush is continuous, intermittent movement being applied only to relatively light parts and limited in amount to that required to bring the brush into contact engaging position, which amount is extremely slight due to the slight gap between the brush and the contact segments. Even this slight intermittent motion is derived from the translation of a portion of the continuous rotary motion of the more massive moving parts such as the motor armature, gears, shaft, cam member, etc. This makes for accuracy in timing at high speeds. Accuracy and reliability are further assured through the use of a substantially constant speed motor of ample size and capacity.

While a particular embodiment of the invention has been herein shown and described for the sake of disclosure, it is to be understood that the invention is not limited to such particular embodiment but contemplates all such modifications and variants thereof as fairly fall within the scope of the appended claims.

What I claim is:

1. A timing device for electric circuits comprising a pair of relatively movable contacts, means for continuously moving one of said contacts in relation to the other in cyclic motion and in spaced parallel planes, enabling means operable upon actuation to move said contact and its plane of continuous motion into the path of the other before contacting therewith and out of said path after discontinuance of said contact due to said continuous relative movement, a control element operable when moved into control position to effect an actuation of said enabling means, electrical limiting means operable after each complete operation of said enabling means to render said enabling means ineffective for repeated action, and electrical locking means operable to hold said limiting means in operated condition while said control element is in control position and to release said limiting means upon movement of the control element out of control position.

2. A timing device for electric welding circuits comprising a stationary contact, a movable contact arranged to slide over the stationary contact to make and break said circuit, means for continuously moving said movable contact for repeated operation, biasing means tending to normally hold the contact out of engagement, electrically operated means operable during energization to hold said contacts in position for operative engagement against the tension of said biasing means, a control element operable when moved into control position to effect energization of the said electrically operated means, a self-locking limit relay operable upon energization to open the circuit of said electrically operated means and close its locking circuit, switching means operated in the movement of said movable contact to close the energizing circuit of said limit relay, said holding circuit being arranged to be opened by the control element upon movement of the control element out of control position.

3. A timing device for electric circuits comprising a stationary timing contact connected to one terminal of a gap in the circuit, a stationary circuit breaking contact connected to the timing contact through a voltage-reducing resistance shunt, and a movable contact connected to the other terminal of the gap and arranged to slide first over the timing contact and then over the circuit breaking contact, said movable contact being co-axially mounted and relatively movable as respects said stationary timing and circuit breaking contacts and normally biased in a plane axially spaced therefrom, and electrical means arranged to effect an axial movement of said movable contact into the plane of said stationary contacts, said movable contact being arranged to contact with the circuit breaking contact before leaving the timing contact.

4. A timing device for electric circuits comprising a plurality of fixed concentrically mounted contacts, a relatively movable contact co-axially mounted with respect to said fixed contacts, an electric motor for continuously co-axially moving said contacts in relation to each other in cyclic motion and in spaced parallel paths, means operable upon actuation of a control element to move said movable contact into the path of said fixed contacts before contacting therewith, and out of said path after discontinuance of said contacting due to said continuous relative movement, a control element operable when moved into control position to effect an actuation of said means, limiting means operable after each complete operation of said first named means to render said first named means ineffective for repeated action during continuance of the actuation of said control element, and a locking relay operable to hold said limiting means in operated condition during the continuance of said control element in control position, and to release said limiting means upon the release of said control element out of control position.

5. A timing device for electric circuits comprising a plurality of fixed concentrically mounted contacts, means for pre-determining the effective circuit closing length of said contacts, a relatively movable contact co-axially mounted with respect to said fixed contacts, an electric motor for continuously moving said contacts in relation to each other in cyclic motion and in spaced parallel planes, means operable upon actuation of a control element to move said movable contact into the plane of said fixed contacts before contacting therewith, and out of said plane after discontinuance of said contacting due to said continuous relative movement, a control element operable when moved into control position to effect an actuation of said last named means, limiting means operable after each complete operation of said last named means to render said last named means ineffective for repeated action during continuance of the actuation of said control element, and a locking relay operable to hold said limiting means in operated condition during the continuance of said control element in control position, and to release said limiting means upon the release of said control element out of control position.

6. A timing device for electric circuits comprising a plurality of stationary concentrically mounted contacts, means arranged to interconnect a pre-determined number of said stationary contacts, a movable contact arranged to slide over said stationary contacts and coaxially mounted with respect thereto and arranged for axial movement into contacting engagement therewith to make and break a circuit, a motor for continuously moving said movable contact for repeated operation relatively to said fixed contact, biasing means tending to normally hold said contacts out of engagement, an electrically operated enabling relay operable during energization to axially move said movable contact into contacting position for operative engagement with said fixed contacts against the tension of said biasing means, a control element for the device, said control element when moved into operative position effecting the energization of said electrically operated enabling relay, a self locking limit relay operable upon energization to open the circuit of said enabling relay and to close the locking circuit of itself, and relatively movable contacts operated by the axial movement of said movable contact whereby to close the energizing circuit of said limit relay after the circuit closing and opening action of said stationary and movable contacts, said self-locking limit relay locking circuit being arranged for de-energization by said control element upon the movement thereof out of control position.

7. A timing device for an electric circuit for effecting substantially instantaneous welds, including a continuously movable circuit closing and opening device comprising fixed and relatively movable coaxially mounted contacts, and means other than the contacts themselves for intermittently imparting axial movement to said movable contact for rendering the same effective without interrupting the continuous movement of said contacts.

8. A timing switch for an electric circuit comprising a continuously movable circuit closing and opening device including relatively movable coaxially mounted fixed and movable contacts, a fixed contact, a movable contact and an electric motor arranged to rotate the same, means arranged to move said movable contact axially into and out of contacting engagement with said fixed contact without interrupting said continuous motion, control means for said apparatus including a control element, and means for rendering said contacts upon actuation of said control element effective for one circuit closing and opening action only, and thereafter to return the contact members to their normal ineffective position.

9. A timer for electric circuits comprising a circuit and relatively movable contacts arranged to effect the energization and de-energization of said circuit, push button means to initiate the operation of the timer, continuously rotating means for effecting the timed operation of said contacts, electro-magnetic actuator means whose operation is effected by the actuation of said push button means and arranged to effect the timed engagement of said contacts, means for selecting the period of effective engagement of said contacts, and electrical relay means limiting the energization of said circuit to one operative energization only for each actuation of said push button means.

10. A timing switch apparatus for electric circuits comprising relatively movable contacts arranged to effect the connection and disconnection of the circuits, push button means to initiate the operation of the timing switch, continuously rotating means for effecting the timed operation of said contacts, electro-magnetic actuator means whose operation is effected by the actuation of said push button means and arranged to effect the timed engagement of said contacts, means for selecting the period of effective engagement of said contacts, and means limiting the connection of said circuits to one operative connection only for each actuation of said push button means, said last named means being operated by and including an electrical locking relay means controlled by the push button.

11. A timing switch system for controlling an electric circuit comprising relatively movable contacts arranged to effect the closing and opening of said circuit, push button means to initiate the operation of said system, continuously rotating means for effecting the timed operation of said contacts, electro-magnetic actuator means whose operation is effected by the actuation of said push button means and arranged to effect the timed engagement of said contacts, means for selecting the period of effective engagement of said contacts, and means limiting the simultaneous energization of said circuits to one operative energization only for each actuation of said push button means, said last-named means operating by a locking means whose operation is controlled by the actuator.

12. In combination with an energizing circuit and a working circuit, of relatively movable contacts arranged to effect the energization and de-energization of said circuits, push button means to initiate the operation of said combination, continuously rotating means for effecting the timed operation of said contacts, electro-magnetic actuator means whose operation is effected by the actuation of said push button means and arranged to effect the timed engagement of said contacts, means for selecting the period of effective engagement with said contacts, and means limiting the energization of said circuits to one operative energization only for each actuation of said push button means, the operation of said last-named means being effected by a locking means whose operation is actuated by said actuator and terminated by said push button means.

13. A timed switch apparatus for electric circuits comprising relatively movable contacts arranged to effect the energization and de-energization of a circuit, push button means to initiate the operation of the switch, continuously rotating means for effecting the timed operation of said contacts, electro-magnetic actuator means whose operation is effected by the actuation of said push button means and arranged to effect the timed engagement of said contacts, means for selecting the period of effective engagement of said contacts, means limiting the energization of the circuit to one operative energization only for each actuation of said push button means, and means arranged to open the circuit of said push button means whose operation is effected through the operation of said relatively movable contacts.

14. A timing device for electric circuits comprising a circuit, a pair of relatively movable co-axially mounted contacts in the circuit normally spaced apart, means for maintaining continuous relative rotary motion between said contacts, and means other than the contacts themselves for relatively axially moving said contacts into and out of contacting relation without interrupting said continuous relative rotary motion whereby to effect an energization of the circuit.

15. A timing device for electric circuits comprising a circuit, a continuously mechanically operated rotary circuit making and breaking means in said circuit including a pair of co-axially mounted relatively movable contacts normally occupying planes spaced apart, and means for relatively axially moving said contacts to render the same electrically operative or inoperative through their relative rotary motion without interrupting said continuous rotary operation.

16. A timing device for electric circuits comprising a circuit, a continuously mechanically operated rotary circuit making and breaking means comprising fixed and relatively movable co-axially mounted contacts connected in said circuit, means normally maintaining said continuously operated means ineffective to make the circuit, control means operable to render said continuously operated means effective to make and break the circuit through relative rotary motion between said contacts which means impart a relative axial movement of the contacts, and means operable after each make and break of the circuit by said rotary motion to render said control means ineffective until it is operated again after the completion of an initiated circuit timing operation.

17. A timing device for electric circuits comprising a circuit, a continuously operated relatively movable rotary circuit closing and opening means co-axial with each other for said circuit arranged to successively close and open said circuit in repeated cycles, means for normally spacing from each other in different planes and maintaining so spaced and ineffective to close the circuit said relatively movable circuit closing and opening means, and means for rendering the circuit closing and opening means effective during a portion only of its rotary cycle of operation.

18. A timing device for electric circuits comprising a fixed contact and a relatively movable co-axially mounted contact, means for continuously relatively moving said movable contact in rotary relation to the other in cyclic motion and in a spaced parallel plane, enabling means independent of the contacts themselves for relatively axially moving said movable contact into the plane of the fixed contact for contacting therewith, and means for controlling the rotary length of said fixed contact which may be effective to close the circuit.

19. A timing device for electric circuits comprising a stationary contact, a co-axially mounted movable contact arranged to slide over the stationary contact to make and break said circuit, biasing means tending to normally hold the contacts out of engagement in spaced parallel planes, means for continuously relatively moving said contacts in said spaced planes and electrically operated means operable during energization to hold said contacts in relative position for operative engagement in the plane of the stationary contact against the tension of said biasing means.

20. A timing device for electric circuits comprising a stationary contact, a movable contact co-axially mounted with respect to and rotatable to slide over the stationary contact to make and break a circuit, means for continuously rotating the movable contact in a manner for repeated operation but normally in axially spaced relation to and out of contact with said stationary contact during complete revolutions, control means movable into and out of operating position, and means operable upon movement of the control means into operating position to move said contacts axially into and out of contacting position once only and during one of the repeated operations of the movable contact.

21. Automatic timing mechanism for electric circuits comprising co-axially mounted fixed and relatively rotary contact devices arranged to be moved axially into initial contacting engagement to control the supply of current, a constant speed motor for driving said rotary contact device, and means for varying at will the effective angular extent of said fixed contacts while the apparatus is in operation, whereby the period during which current is supplied may be adjusted as desired.

22. In combination with an electric circuit a timing device comprising relatively movable contact devices arranged to effect the energization and de-energization of the circuit, a control element for initiating the operation of the timing device, electrical actuator means operable upon each actuation of the control element to effect one energization and de-energization of said circuit, and a lock-out relay effective after the circuit energization is terminated to break the circuit of the actuator passing through the control element and the lock-out relay.

23. A timing switch apparatus to effect the connection of alternating current circuits comprising relatively movable contact devices arranged to effect the energization and de-energization of the circuits, an initiating means for initiating an operation of the timing switch, electrical actuator means operable upon each actuation of the initiating means to effect an energization and de-energization of the circuits and a lock-out relay effective to break the circuit of said electrical actuator means through the initiating means, and said lock-out relay having a lock-in circuit effective through the initiating means.

24. A timing system for electric welding machines comprising a high speed continuously rotating welding circuit control switch operating to control a welding circuit through a plurality of continuously rotating contacts, an enabling device for cutting into and out of circuit closing and opening action said high speed continuously rotating switching apparatus and having control of the effectiveness of said switching apparatus, and means operating through said continuously rotating contacts limiting the enablement of said switching apparatus by said enabling device to a single effective control of a welding circuit through its continuously rotating contacts for a single operation of the enabling device.

25. A timing system for electric circuits comprising a plurality of relatively movable contacts synchronously driven with respect to each other, a circuit arranged to be energized for an adjustable definite timed period through said contacts, an enabling device arranged to cut said contacts into and out of effective circuit closing and opening action, means to initiate the operation of said enabling device, and means including a locking relay, jointly operating through said circuit timing contacts and through said initiating means, whereby to limit the enabling action of said enabling device to a single effective circuit closing operation of said circuit contacts for each single operation of the initiating means.

EARL J. W. RAGSDALE.